(12) United States Patent
McCoy et al.

(10) Patent No.: US 8,091,352 B2
(45) Date of Patent: Jan. 10, 2012

(54) IGNITION SYSTEM

(75) Inventors: Steven R. McCoy, Washington, IL (US);
Sean O. Cornell, Gridley, IL (US);
Robert M. Lucas, Spring Valley, IL (US)

(73) Assignee: Caterpillar Inc., Peoria, IL (US)

( * ) Notice: Subject to any disclaimer, the term of this patent is extended or adjusted under 35 U.S.C. 154(b) by 1006 days.

(21) Appl. No.: 11/646,464

(22) Filed: Dec. 28, 2006

(65) Prior Publication Data
US 2008/0156292 A1    Jul. 3, 2008

(51) Int. Cl.
*F01N 3/00* (2006.01)
*F01N 3/10* (2006.01)
*F23Q 7/06* (2006.01)
*F23Q 3/00* (2006.01)
*F02B 3/00* (2006.01)
*F02B 31/00* (2006.01)
*H01T 13/20* (2006.01)
*H01T 13/02* (2006.01)

(52) U.S. Cl. ............. 60/303; 60/286; 60/282; 431/258; 431/263; 431/264; 431/265; 431/266; 123/298; 123/306; 123/309; 123/169 EL; 313/131 R; 313/139; 313/143

(58) Field of Classification Search .................. 60/282, 60/303, 286; 431/258, 263–266; 123/298, 123/306, 309, 169 EL; 313/131 R, 139, 143
See application file for complete search history.

(56) References Cited

U.S. PATENT DOCUMENTS

| | | | |
|---|---|---|---|
| 2,422,610 A | 10/1938 | Bagnulo | |
| 2,165,176 A | 7/1939 | Fodor | |
| 2,728,408 A * | 12/1955 | Deliman | 422/174 |
| 4,549,399 A * | 10/1985 | Usui et al. | 60/286 |
| 4,651,524 A * | 3/1987 | Brighton | 60/274 |
| 5,189,333 A | 2/1993 | Kagawa et al. | |
| 5,581,145 A * | 12/1996 | Kato et al. | 313/141 |
| 5,992,364 A | 11/1999 | Bubeck et al. | |
| 6,229,253 B1 | 5/2001 | Iwata et al. | |
| 6,819,032 B2 | 11/2004 | Matsubara | |
| 7,404,389 B2 * | 7/2008 | Tanaka et al. | 123/295 |
| 2005/0081820 A1 | 4/2005 | Tanaka et al. | |

FOREIGN PATENT DOCUMENTS

| | | |
|---|---|---|
| DE | 2436698 | 3/1975 |
| DE | 19627524 | 1/1998 |
| EP | 0470688 | 2/1992 |
| JP | 57-361 | 1/1982 |
| JP | 58-172470 | 10/1983 |
| JP | 62-186050 | 8/1987 |

OTHER PUBLICATIONS

PCT International Search Report, File Ref. No. 06-307, PCT/US2007/025255, Filing Date: Dec. 11, 2007; Applicant: Caterpillar Inc.

* cited by examiner

*Primary Examiner* — Thomas Denion
*Assistant Examiner* — Michael Carton
(74) *Attorney, Agent, or Firm* — Finnegan, Henderson, Farabow, Garrett & Dunner LLP

(57) ABSTRACT

An ignition system includes an electrical energy delivery device having a first electrode terminating at a first end portion and a second electrode positioned in the ignition system separately from the electrical energy delivery device. The second electrode terminates at a second end portion disposed a first distance from the first end portion to form an air gap therebetween. The air gap forms an area including the shortest distance between the first electrode and the second electrode.

18 Claims, 3 Drawing Sheets

IGNITION SYSTEM

TECHNICAL FIELD

This disclosure relates generally to an ignition system and, more particularly, to an electrical energy delivery device for use in an ignition system.

BACKGROUND

Internal combustion engines, including diesel engines, gasoline engines, natural gas engines, and other engines known in the art, may exhaust a complex mixture of air pollutants. The air pollutants may be composed of gaseous compounds, which may include nitrous oxides (NOx), and solid particulate matter, which may include unburned carbon particulates called soot.

Due to increased attention on the environment, exhaust emission standards have become more stringent, and the amount of gaseous compounds emitted to the atmosphere from an engine may be regulated depending on the type of engine, size of engine, and/or class of engine. One method that has been implemented by engine manufacturers to comply with the regulation of these engine emissions is exhaust gas recirculation (EGR). EGR systems recirculate the exhaust gas byproducts into the intake air supply of the internal combustion engine. The exhaust gas directed to the engine cylinder reduces the concentration of oxygen within the cylinder and increases the specific heat of the air/fuel mixture, thereby lowering the maximum combustion temperature within the cylinder. The lowered maximum combustion temperature and reduced oxygen concentration can slow the chemical reaction of the combustion process and decrease the formation of NOx.

In many EGR applications, the exhaust gas is passed through a particulate filter and catalyst containing precious metals. The particulate filter may capture a portion of the solid particulate matter carried by the exhaust. After a period of use, the particulate filter may become saturated and may require cleaning through a regeneration process wherein the particulate matter is purged from the filter. In addition, the catalyst may oxidize a portion of the unburned carbon particulates contained within the exhaust gas and may convert sulfur present in the exhaust to sulfate ($SO_3$).

The regeneration process may include using a regeneration device coupled within an exhaust treatment system. In some examples, the regeneration device may include an ignition system having, for example, a fuel injector and an electrical energy delivery device to facilitate combustion within the regeneration device. U.S. Pat. No. 5,189,333 issued to Kagawa et al. discloses an electrical energy delivery device which may be used with a fuel injector to ignite an air-fuel mixture such as via an electric spark. The electrical energy delivery device, or spark plug, of Kagawa et al. includes a central electrode and a parallel ground electrode. The central electrode protrudes from a lower end of an insulator. The insulator may be coupled to a main metal shell of the electrical energy delivery device. The parallel ground electrode is arranged opposite to the central electrode. One end of the ground electrode may be bonded to a main metal shell. An air-fuel mixture may be ignited by a spark discharge in an air gap between the central electrode and the parallel ground electrode.

However, the ignition system of Kagawa et al. may provide inconsistent ignition of the air-fuel mixture during one or more ignition attempts. For example, the amount and/or concentration of the air-fuel mixture may fluctuate around the ignition area, or air gap, in the design of Kagawa et al. Hence, a poorly positioned ground electrode, for example, one being positioned relative to the central electrode for generating an appropriate electrical current in an air gap therebetween, may not be able to provide proper ignition. The arrangement provided by Kagawa et al. may also allow fouling, such as carbon deposit build-up, to develop along components of the electrical energy delivery device. These components may include surface portions along the central and ground electrodes. Such fouling may also prevent proper ignition of the air-fuel mixture. Furthermore, the placement of the ground electrode with respect to additional components of the electrical energy delivery device of Kagawa et al., including, for example, the central electrode, may allow arcing outside of the air gap in the ignition area. This may include arcing along portions of the central or ground electrode connected to the base portion of the electrical energy delivery device. Arcing outside of the gap ignition area may also yield unfavorable and inconsistent ignition results.

The present disclosure is directed towards overcoming one or more shortcomings set forth above.

SUMMARY OF THE INVENTION

In accordance with one disclosed exemplary embodiment, an ignition system includes an electrical energy delivery device having a first electrode terminating at a first end portion and a second electrode positioned in the ignition system separately from the electrical energy delivery device. The second electrode terminates at a second end portion disposed a first distance from the first end portion to form an air gap therebetween. The air gap forms an area including the shortest distance between the first electrode and the second electrode.

In accordance with another disclosed exemplary embodiment, an ignition system for use in an aftertreatment system located downstream of an exhaust manifold of an internal combustion engine includes a combustor head, an electrical energy delivery device mounted within a passage of the combustor head, and a first electrode extending through the passage and terminating at a first end portion, the first electrode being coupled to a main body of the electrical energy delivery device. The system also includes a second electrode terminating at a second end portion outside of the passage, the second electrode positioned separately from the main body and the second end portion being disposed a first distance from the first end portion to form an air gap therebetween.

According to another exemplary disclosed embodiment, a method for producing ignition of a fuel air mixture within a combustion chamber includes positioning a first electrode within a passageway so that an end portion of the first electrode is located at a first distance from a plane along an outer edge of a fuel spray, and positioning an end portion of a second electrode at a second distance from the end portion of the first electrode so as to form an air gap between the end portions, the end portion of the second electrode being at a third distance from the plane. The method also includes supplying pressurized air to the passageway and along the first electrode in a direction toward the end portion of first electrode and igniting an air-fuel mixture in the vicinity of the air gap

DETAILED DESCRIPTION

Figure 1:
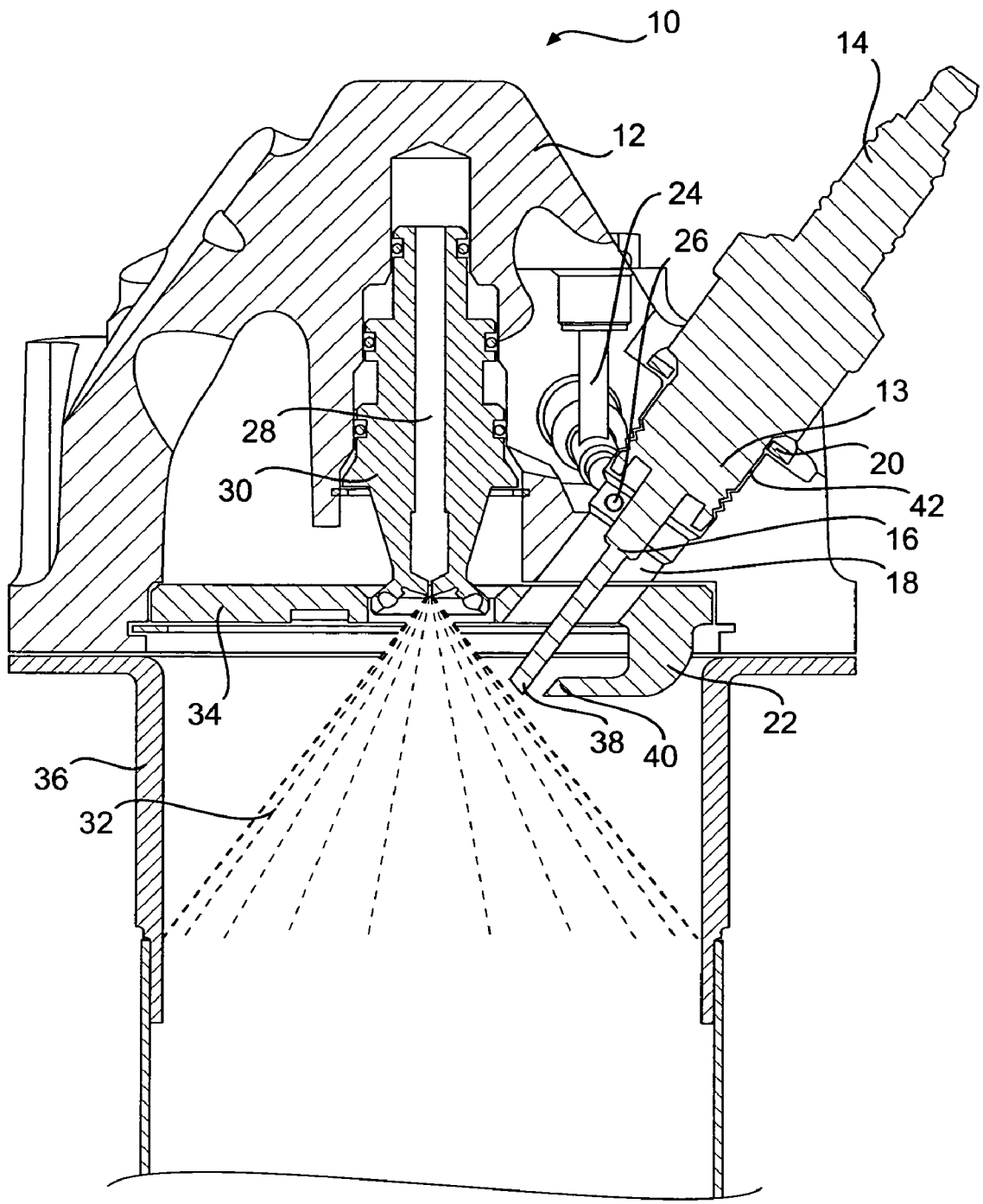
FIG. 1 provides a diagrammatic cut away view of a combustor head and fuel nozzle assembly according to an exemplary disclosed embodiment.

FIG. 1 illustrates an ignition system 10 which may be utilized in an aftertreatment system, such as a regeneration device. The regeneration device may include an ignition system 10 having, for example, a fuel injector and an electrical energy delivery device 14 to facilitate combustion within the regeneration device. In an exemplary embodiment, it is understood that the regeneration device may receive a supply of a combustible substance and a supply of air to facilitate combustion within the regeneration device. The combustible substance may be, for example, gasoline, diesel fuel, reformate, and/or any other combustible substance known in the art.

The ignition system 10 may include a combustor head 12 coupled to an electrical energy delivery device 14. In one embodiment, a main body portion 13 of the electrical energy delivery device 14 may be mounted to the combustor head 12 by a threaded connection. Hence, a portion of the electrical energy delivery device 14 may be inserted into a receiving socket 42 of the combustor head 12 wherein threads of the electrical energy delivery device 14 may be engaged with mating threads of the receiving socket 42. While a threaded connection has been described, other types of connections suitable for mounting the electrical energy delivery device 14 to the combustor head 12 may be utilized.

The electrical energy delivery device 14 may include a center electrode 16 which may be mounted, for example, to the main body portion 13. The center electrode 16 may be inserted through an air passageway 18 of the combustor head 12 during assembly. The electrical energy delivery device 14 may be seated upon a seating element 20 such as a washer. The seating element 20 may include a thickness suitable for adjusting a mounting position of the electrical energy delivery device 14 with respect to the combustor head 12. This may also adjust components of the electrical energy delivery device 14 relative to other components such as those within the combustion head 12. For example, by varying the thickness of the seating element 20, the end 38 of the center electrode 16 may be adjusted proximate to or away from a fuel spray 32.

The ignition system 10 may also include an air feed assembly 24. In one embodiment, the air feed assembly 24 may be disposed within the combustor head 12. The air feed assembly 24 may be configured to provide pressurized air to the air passageway 18, such as through inlet 26, and to the an upstream side of a swirl plate 34. The pressurized air supplied to the air feed assembly 24 may originate from an intake side of an internal combustion engine and may include pressurized air or a pressurized mixture of air and recirculated engine exhaust gases. Inlet 26 of air passageway 18 may provide an access point for allowing air to flow into the air passageway 18 and generally towards a location of the fuel spray 32. It is understood that the air passageway 18 and inlet 26 may be omitted in an alternative embodiment consistent with this disclosure.

The combustor head 12 may house additional components, including, for example, a fuel nozzle 30 having a fuel passageway 28. The fuel passageway 28 may receive a supply of a combustible substance or fuel. Thus, the combustible substance or fuel may be supplied through the fuel passageway 28 to produce a fuel spray 32 along a longitudinal axis. The fuel spray 32 may be generated within, for example, a combustion housing 36.

Figure 2:
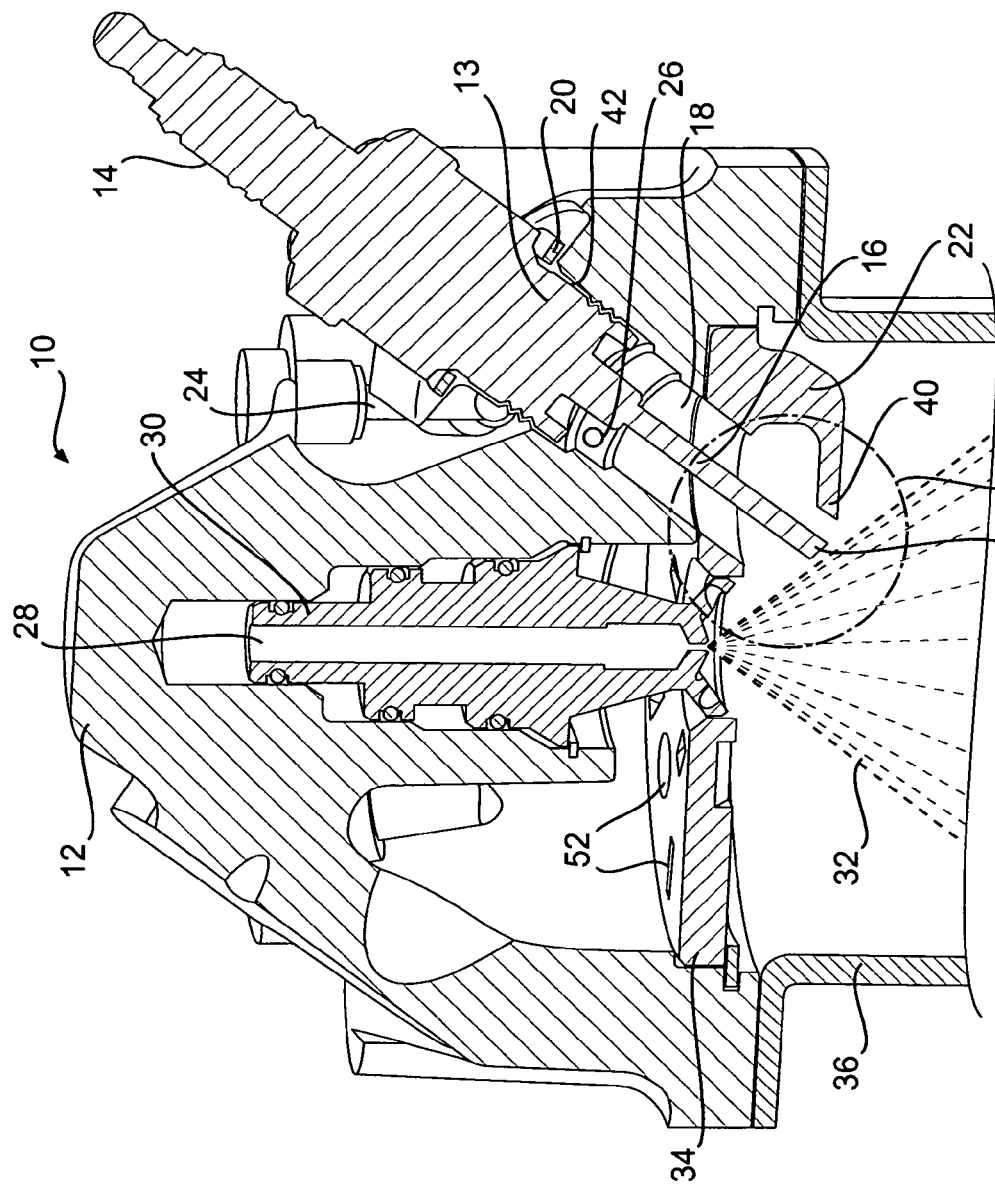
FIG. 2 provides a rotated perspective view of the combustor head and fuel nozzle assembly of FIG. 1.

The swirl plate 34 may be provided within the combustor head 12 in order to facilitate mixing of pressurized air from air feed assembly 24 and fuel from fuel nozzle 30 in the combustion housing 36. For example, the disclosed embodiment shown in FIG. 2 illustrates a plurality of holes or vents 52 disposed at prescribed locations along a surface of the swirl plate 34. The holes or vents 52 may allow suitable passage of air (or mixture of air and engine exhaust gases) therethrough. As the air traverse through the swirl plate 34 and mixes with the fuel spray, an appropriate air-fuel mixture may be produced within the combustion housing 36.

The ignition system 10 may also include another electrode such as ground terminal 22. The ground terminal 22 may be provided as a separately connected element from the main body portion 13 of the electrical energy delivery device 14. Hence, the ground terminal 22 may be mounted at a separate location from other components of the electrical energy delivery device 14. For example, in one disclosed embodiment, the ground terminal 22 may be mounted integrally with the swirl plate 34. The ground terminal 22 may extend in a direction toward the center electrode 16 and terminate at an end 40. With this configuration, the end 40 of ground terminal 22 may be separately fixed in position at a desired location from the fuel spray 32 irrespective of the location of the center electrode 16. This separately fixed location of the end 40 of the ground terminal 22 allows for variations in the location of the center electrode 16, while maintaining a location of the ignition area or air gap (distance 46 in FIG. 3) between the ground terminal end 40 and the center electrode end 38. While one embodiment has been described to include the ground terminal 22 being mounted integrally with the swirl plate 34, other suitable mounting locations separate from the center electrode 16 may be provided for the ground terminal 22.

Figure 3:
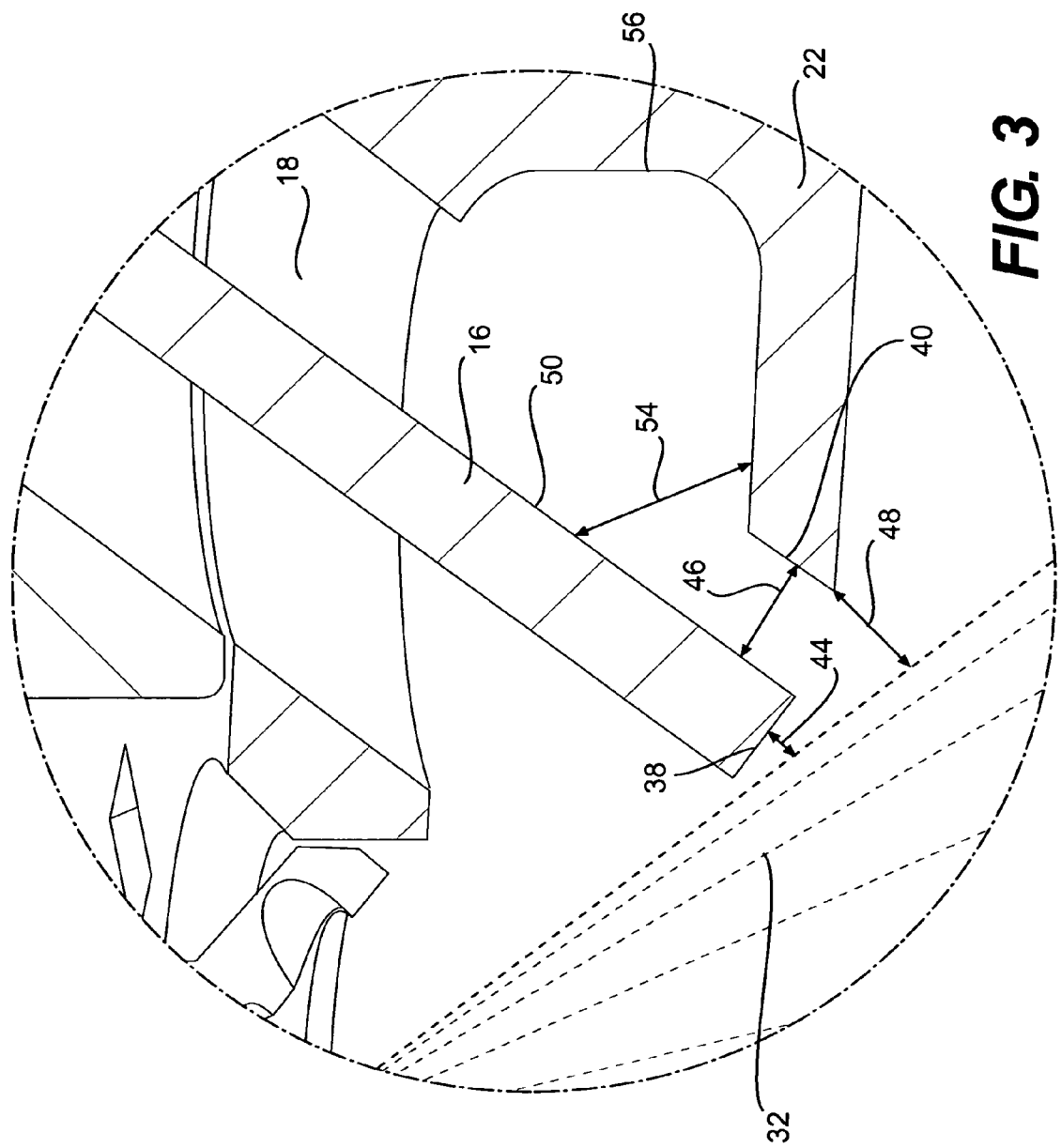
FIG. 3 provides an enlarged detail view of the center electrode and ground terminal in relation to the fuel spray of FIG. 2.

Turning to FIG. 3, an enlarged detail view of the center electrode 16 and ground terminal 22 relative to the fuel spray 32 is illustrated. Again, the end 38 of the center electrode 16 may be disposed, for example, in a final assembly, at a distance 44 away from an outer plane of the fuel spray 32. As discussed above, one disclosed embodiment may include adjusting the end 38 of the center electrode 16 proximate to or away from the outer plane along the length of the fuel spray 32 by varying the thickness of the seating element 20. In some embodiments, the distance 44 may include a range of approximately 1.0-10.0 mm.

As noted above, the end 40 of the ground terminal 22 may be disposed at a distance 46 from the end 38 of the center electrode 16 to form an air gap or ignition area. In some embodiments, the distance 46 may include a range of approximately 1.2-4.4 mm. One disclosed embodiment of the ground terminal 22 may include a curved surface 56. An extension of the surface 56 relative to the center electrode 16 may form a gap 54 therebetween. A configuration of the gap 54 may include a portion which radially increases, for example, as measured from a point along a length 50 of the center electrode 16 while traversing a distance along surface 56 of the ground terminal 22 (e.g., such as from end 40 towards the mounted location of the ground terminal 22). In one embodiment, a measured distance from a point along the length 50 of the center electrode 16 to the surface 56 within the gap 54 may be greater than the distance 46. While a curved surface 56 has been described as part of an extension of the ground terminal 22, other surface designs and shapes suitable for extending the end 40 of the ground terminal 22 proximate to the end 38 of the center electrode and forming a radial gap 54 with respect to the center electrode 16 may be utilized.

The end 40 of the ground terminal 22 may also be disposed, for example, in a final assembly, at a distance 48 away from the outer plane of the fuel spray 32. In some embodiments, the distance 48 may also include a range of approximately 1.0-10.0 mm

INDUSTRIAL APPLICABILITY

The ignition system 10 of the present disclosure may be used with any combustion-type device such as, for example, an engine, a furnace, or any other device known in the art where ignition of a combustible substance is desired. By way of example, the ignition system 10 may be used in an aftertreatment system downstream of an exhaust manifold of an internal combustion engine, such as a diesel engine. In such an aftertreatment system, ignition system 10 would be used to facilitate the heating of exhaust gases exiting the engine to temperatures sufficient to regenerate a particulate filter located downstream of the ignition system 10.

The ignition system 10 may be useful in enhancing the probability of ignition, and the formation of an ignition area in a desired location. This is due to the prescribed location of components of the ignition system 10 and their respective design. In particular, the separate nature and particular shape of the ground terminal 22 with respect to the center electrode 16 of the electrical energy delivery device 14 provides for a substantially fixed or consistent location of the ignition area with respect to the fuel spray provided by the fuel nozzle 30. Because the ignition area is defined by the electrical energy or arc that bridges the gap between the end 38 of central electrode 16 and the end 40 of ground terminal 22, the location of the ignition area is a function of the location of both the electrical energy device 14 and the ground terminal 22. Thus, by locating the ground terminal 22 on a component separate from the electrical energy delivery device 14, and at a particular location with respect to the fuel spray, the ground terminal 22 may provide for a substantially fixed or consistent location of the ignition area regardless of variations in the location of the end 38 of central electrode 16. Variations in the location of the central electrode 16 may occur due to variations associated with the coupling the electrical energy delivery device 14 to the combustion head 12. In addition to these advantages, location of the ground terminal 22 separate from the electrical energy delivery device 14 also allows the opening for housing the electrical energy delivery device to be smaller in size because the opening does not have to be large enough to also house the ground terminal 22.

As noted above, the air feed assembly 24 may be configured to supply a flow of pressurized air into the air passageway 18 generally towards a location of the fuel spray 32 and through holes or vents 52 formed in swirl plate 34. The pressurized air flow through passageway 18 may generally traverse a length of the center electrode 16 which may also be disposed through the air passageway 18. The direction of air flow supplied by the air feed assembly 24 through the air passageway 18 may facilitate preventing the fuel spray 32 from traversing up along the length 50 of the center electrode 16 and into the air passageway 18 and may reduce the build up of soot within passageway 18. In particular, by supplying a flow of pressurized air into the air passageway 18 generally towards a location of the fuel spray 32, the disclosed ignition system 10 may also be capable of reducing fouling, such as carbon deposit build-up, along various components thereof. These components may include, for example, build-up along a length 50 of the central electrode 16 and along the extended surface 56 of the ground terminal 22.

As the pressurized air (or air and exhaust gases) is supplied through the swirl plate 34 and through air passageway 18, air mixes with the fuel of the fuel spray in the combustion housing 36, including the region of the ignition area between the end 38 of the center electrode 16 and the end 40 of the ground terminal 22. As discussed earlier, the swirl plate 34 may enhance the quality of the air-fuel mixture. This enhanced quality of air-fuel mixture may include an even more combustible air-fuel mixture which may be provided in the region of the ignition area 46 by the disclosed configuration. Because an enhanced air-fuel mixture may be located in the ignition area 46, the probability of ignition during one or more ignition attempts may be improved. This probability may be further optimized by adjusting the gap distance 46 of the ignition area, the gap distance 44 away from a plane along a location of the fuel spray 32 to the end 38 of the center electrode 16, and the gap distance 48 away from a plane along a location of the fuel spray 32 to the end 40 of the ground terminal 22. These distances 44, 46, and 48 may include the distances within the prescribed ranges of approximately 1.0-10.0 mm, 1.2-4.4 mm, and 1.0-10.0 mm, respectively.

The extension design and mounting location of the ground terminal 22 relative to the center electrode 16 may also increase ignitability and reduce or prevent arcing outside of the ignition area 46. For example the design of the disclosed ground terminal 22 provides an end 40 proximate to an end 38 of the center electrode 16 thus defining an air gap or ignition area 46 therebetween. A radial gap 54 may be formed between a length 50 of the center electrode 16 and a radial surface 56 of the ground terminal 22. Thus, during a combustion process, a voltage difference may be generated between the end 38 and 40 to initiate the ignition of the air-fuel mixture. Another voltage difference may also be produced within the radial gap 54 between the ground terminal 22 and the center electrode 16 during the combustion process. However, since the distance of the radial gap 54 is greater than the distance of the ignition area 46, the electrical resistance provided by the quantity of air in the radial gap 54 is greater than the electrical resistance provided by the quantity of air in the ignition area 46. This higher concentration can increase the probability of ignition occurring within the ignition area 46. This may also reduce or eliminate the probability of arcing occurring outside of the ignition area 46, including, for example, in the radial gap 54.

The configuration of additional components of the disclosed ignition system 10 may also facilitate preventing the combustible substance from igniting within the radial gap 54. For example, the flow of air supplied into the air passageway 18 along the length 50 of the center electrode 16 and towards the fuel spray 32 may also reduce or eliminate the air-fuel mixture from accumulating within the radial gap 54 and becoming ignited. As noted above, this may also facilitate the reduction or elimination of contaminants, such as carbon deposit build-up, along surfaces within the radial gap 54.

It will be apparent to those skilled in the art that various modifications and variations can be made in the disclosed apparatus and method without departing from the scope of the disclosure. Additionally, other embodiments of the apparatus and method will be apparent to those skilled in the art from consideration of the specification. It is intended that the specification and examples be considered as exemplary only, with a true scope of the disclosure being indicated by the following claims and their equivalents.

What is claimed is:

1. An ignition system, comprising:
a spark initiation device having a center electrode extending into a combustion chamber and terminating at a first end portion; and
a portion of a swirl plate extending into the combustion chamber towards the center electrode to form a ground electrode separate from the spark initiation device so as to allow for relative movement therebetween, the portion of the swirl plate terminating at a second end portion to form a spark gap with the first end portion, the spark gap being a region where a spark is formed.

2. The system of claim 1, further including:
a fuel spray having a plane disposed along an outer edge of the fuel spray wherein the first end portion is disposed a second distance from the plane and the second end portion is disposed a third distance from the plane, wherein the third distance is different than the second distance.

3. The system of claim 2, wherein the spark gap is between approximately 1.2 -4.4 mm, the second distance is between approximately 1.0 -10.0 mm, and the third distance is between approximately 1.0 -10.0 mm.

4. The system of claim 2, wherein the portion of the swirl plate extends generally normal to a longitudinal axis of the fuel spray.

5. The system of claim 2, wherein the first end portion and the second end portion are disposed at approximately the same distance along a longitudinal axis of the fuel spray.

6. The system of claim 1, further including:
an air inlet configured to supply a flow of air around the center electrode towards the first end portion.

7. The system of claim 6, wherein the portion of the swirl plate extends into the flow of air.

8. The system of claim 1, wherein the ignition system is located downstream of an exhaust manifold of an internal combustion engine.

9. An ignition system for use in an aftertreatment system located downstream of an exhaust manifold of an internal combustion engine, comprising:
a combustor head;
a spark initiation device extending through an air intake passage of the combustor head;
a center electrode extending into a combustion chamber through the air intake passage and terminating at a first end portion, the center electrode being coupled to a main body of the spark initiation device; and
a ground electrode terminating at a second end portion outside of the air intake passage, the ground electrode being a portion of a swirl plate extending into the combustion chamber towards the center electrode to terminate at the second end portion that is disposed at a distance from the first end portion to form a spark gap therebetween.

10. The system of claim 9, wherein the portion of the swirl plate that forms the ground electrode makes an expanding gap with a length of the center electrode.

11. The system of claim 9, further including:
a coupling associated with the combustor head, the coupling configured to provide pressurized air to the passageway.

12. The system of claim 9, further including:
a fuel spray having a plane disposed along an outer edge of the fuel spray wherein the first end portion is disposed a second distance from the plane and the second end portion is disposed a third distance from the plane, the third distance being greater than the second distance.

13. A method for producing ignition of a fuel air mixture within a combustion chamber, comprising:
positioning a center electrode of a spark initiation device within an air intake passageway of the combustion chamber so that an end portion of the center electrode is located at a first distance from a plane along an outer edge of a fuel spray;
extending a portion of a swirl plate of the combustion chamber into the combustion chamber and towards the center electrode to form a ground electrode that makes a spark gap of approximately 1.2-4.4 mm with the end portion of the center electrode, the ground electrode being separate from the spark initiation device so as to allow for relative movement between the ground electrode and the center electrode;
supplying pressurized air through the air intake passageway to surround the center electrode and flow in a direction toward the end portion of center electrode; and
igniting an air-fuel mixture in the vicinity of the air gap.

14. The method of claim 13, wherein the supplying of pressurized air includes supplying a mixture of pressurized air and engine exhaust gases.

15. The method of claim 13, further including:
positioning the combustion chamber downstream of an exhaust manifold of an internal combustion engine.

16. The method of claim 13, wherein the first distance is approximately 1-10 mm.

17. The method of claim 13, wherein positioning a center electrode includes positioning the center electrode such that the spark gap may be varied by changing a positioning of the spark initiation device within the air intake passageway.

18. The ignition system of claim 9, wherein the spark gap is approximately 1.2-1.4 mm.

* * * * *